United States Patent
Talty et al.

(10) Patent No.: US 8,432,262 B2
(45) Date of Patent: *Apr. 30, 2013

(54) MULTIPLE NEAR FIELD COMMUNICATION TAGS IN A PAIRING DOMAIN

(75) Inventors: Timothy J. Talty, Beverly Hills, MI (US); Michael B. Ames, Lake Orion, MI (US)

(73) Assignees: GM Global Technology Operations LLC, Detroit, MI (US); General Motors LLC, Detroit, MI (US)

( * ) Notice: Subject to any disclaimer, the term of this patent is extended or adjusted under 35 U.S.C. 154(b) by 554 days.

This patent is subject to a terminal disclaimer.

(21) Appl. No.: 12/713,438

(22) Filed: Feb. 26, 2010

(65) Prior Publication Data

US 2011/0210820 A1   Sep. 1, 2011

(51) Int. Cl.
*H04Q 5/22* (2006.01)

(52) U.S. Cl.
USPC ............... 340/10.51; 340/10.1; 340/572.1; 455/41.1

(58) Field of Classification Search ............ 340/10.51, 340/10.5, 10.1, 572.1; 455/41.1, 41.2, 41.3; 713/150, 169
See application file for complete search history.

(56) References Cited

U.S. PATENT DOCUMENTS

| | | | | |
|---|---|---|---|---|
| 6,892,052 B2 * | 5/2005 | Kotola et al. | ............... | 455/41.2 |
| 2006/0258289 A1 * | 11/2006 | Dua | ............... | 455/41.3 |
| 2009/0227282 A1 * | 9/2009 | Miyabayashi et al. | ..... | 455/552.1 |
| 2010/0060050 A1 * | 3/2010 | Muirhead | ............... | 297/217.4 |
| 2010/0144284 A1 * | 6/2010 | Chutorash et al. | ........... | 455/66.1 |

* cited by examiner

*Primary Examiner* — Edwin Holloway, III

(74) *Attorney, Agent, or Firm* — John A. Miller; Miller IP Group, PLC

(57) ABSTRACT

A system and method for simply and securely pairing multiple Bluetooth or other wireless electronic devices in a network. Multiple Near Field Communication (NFC) read-only tags are places in a vehicle or other defined space, such that users of NFC-enabled electronic devices can pass their device near one of the NFC tags, which then transfers encryption key data to the user's device, allowing that device to be automatically joined to a small, secure wireless network. Various embodiments are disclosed for establishing and controlling the network, and applications are suggested for using the ad-hoc network—such as for the control of a vehicle's entertainment system.

15 Claims, 5 Drawing Sheets

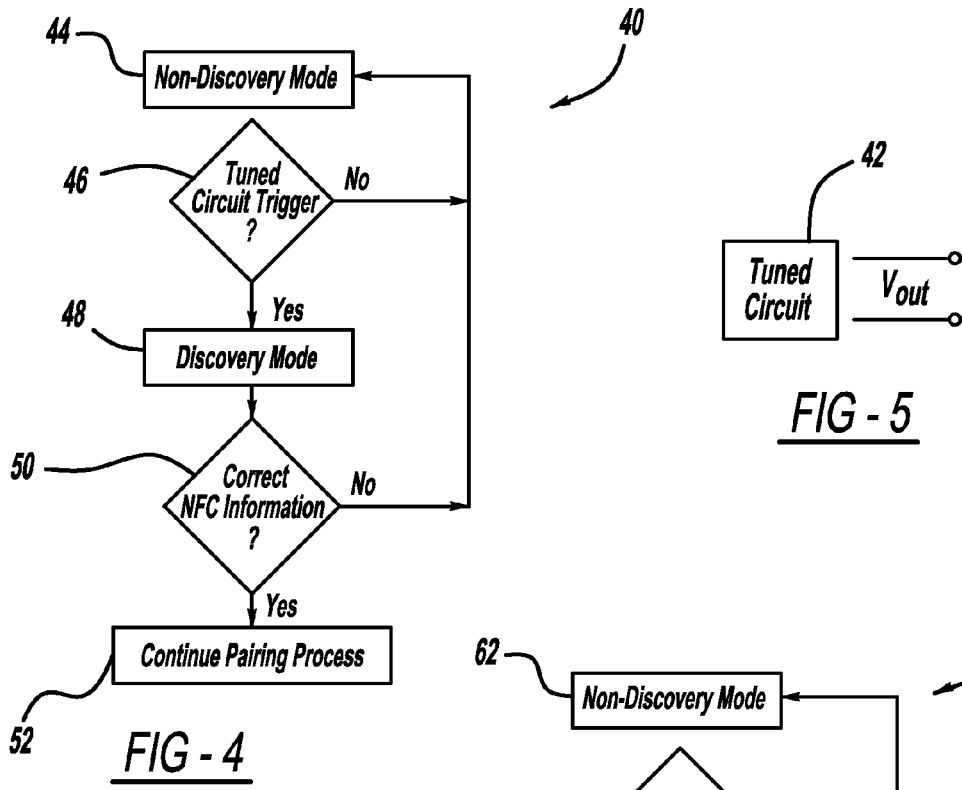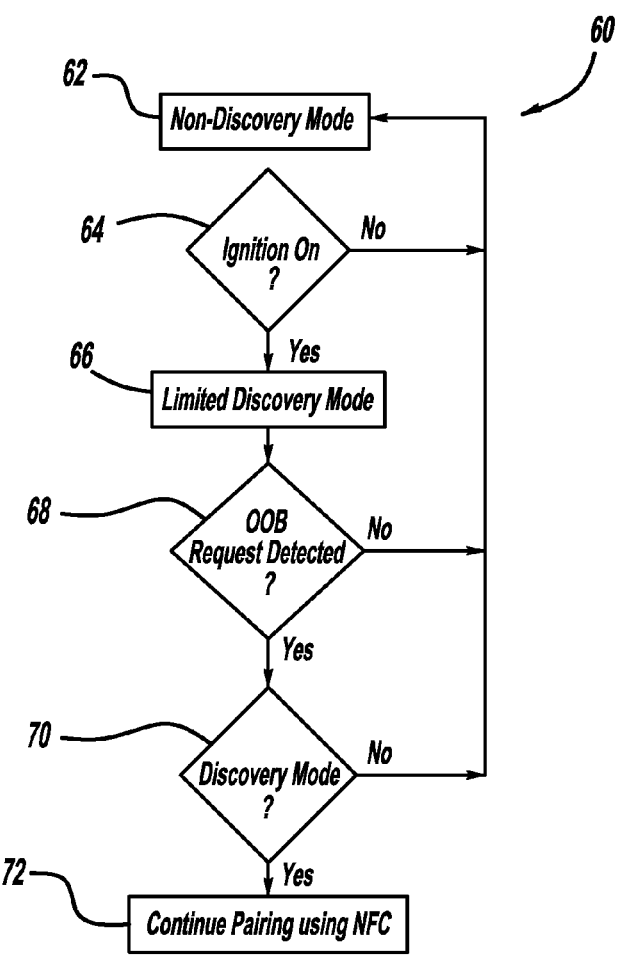

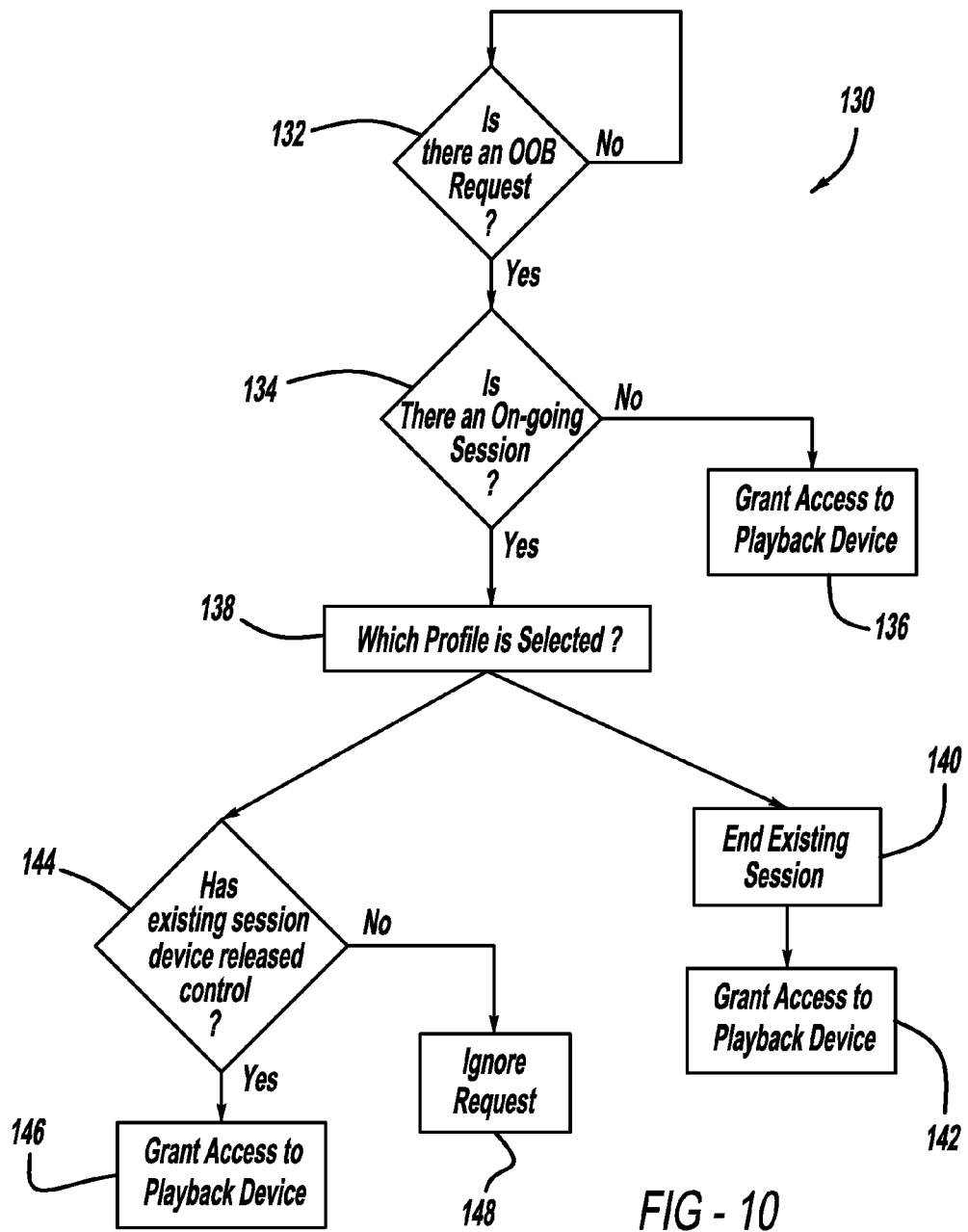

MULTIPLE NEAR FIELD COMMUNICATION TAGS IN A PAIRING DOMAIN

BACKGROUND OF THE INVENTION

1. Field of the Invention

This invention relates generally to wireless communication between consumer electronics devices and, more particularly, to the use of Near Field Communication tags for simplifying the process of pairing, or establishing secure communications between, two or more consumer electronics devices—including in-vehicle systems, mobile phones, MP3 music players, laptop computers, gaming systems, digital cameras, and others.

2. Discussion of the Related Art

Many modern consumer electronics devices use the Bluetooth standard for wirelessly communicating with other such devices. One simple example is a Bluetooth headset for a mobile phone. Once the headset and the mobile phone are "paired"—that is, they have established a communication channel between the two devices—then the user of the mobile phone can operate the phone in a hands-free fashion via the wireless headset. Other examples of Bluetooth-compatible devices include small personal music players which can use Bluetooth to wirelessly play their music over the amplifier and speakers of a larger stereo system, and personal computers which can use Bluetooth to wirelessly connect many types of peripheral devices.

Bluetooth technology has also become a popular feature in vehicles. Many vehicles now include capability for a driver or occupant to wirelessly connect a personal consumer electronics device with the vehicle's embedded entertainment and communication systems via Bluetooth. One example of this is using a vehicle's microphone and speaker system to operate a driver's mobile phone in a hands-free fashion. Another example is playing music from a small personal music player through a vehicle's stereo sound system. Bluetooth wireless connectivity has gained rapid acceptance for these types of applications and many others.

But until now, "pairing" two Bluetooth devices—that is, establishing secure communications between them—has been a cumbersome process. This is because security measures have been designed into the process of establishing Bluetooth communications between devices to prevent access by unknown or unauthorized devices. The security measures include the required sharing of encryption keys between devices, and this leads to a process that is often found to be confusing or problematic to the device users. The same type of problem exists in establishing wireless Local Area Network (wireless LAN, also known as Wi-Fi) connectivity between a computer and a wireless router. What is needed is a way to maintain the security of using an encryption key to establish either Bluetooth or Wi-Fi connectivity, but make the pairing process much simpler for the device user.

SUMMARY OF THE INVENTION

In accordance with the teachings of the present invention, systems and methods are disclosed for quickly and easily establishing secure wireless communication between two or more consumer electronic devices. The electronic devices can communicate using the Bluetooth wireless communication standard, wireless Local Area Network (wireless LAN, or Wi-Fi) standard, or other wireless communication protocols. The disclosed systems and methods use Near Field Communication (NFC) technology to automatically share encryption key data, which is required by both Bluetooth and Wi-Fi in order to establish secure communication between devices. The resultant process for pairing devices, or establishing secure communication between them, is greatly simplified for the device users.

Additional features of the present invention will become apparent from the following description and appended claims, taken in conjunction with the accompanying drawings.

BRIEF DESCRIPTION OF THE DRAWINGS

FIG. 4 is a flow chart diagram showing a process for pairing Bluetooth devices that uses an NFC tag and a tuned object detection device;

FIG. 5 is a block diagram of a tuned circuit used in the process of FIG. 4;

FIG. 6 is a flow chart diagram showing a process for pairing Bluetooth devices that uses an NFC tag and a software algorithm;

FIG. 10 is a flow chart diagram showing a process for quick control of an entertainment system's playback features using NFC tags for secure pairing of Bluetooth devices.

DETAILED DESCRIPTION OF THE EMBODIMENTS

Figure 1:
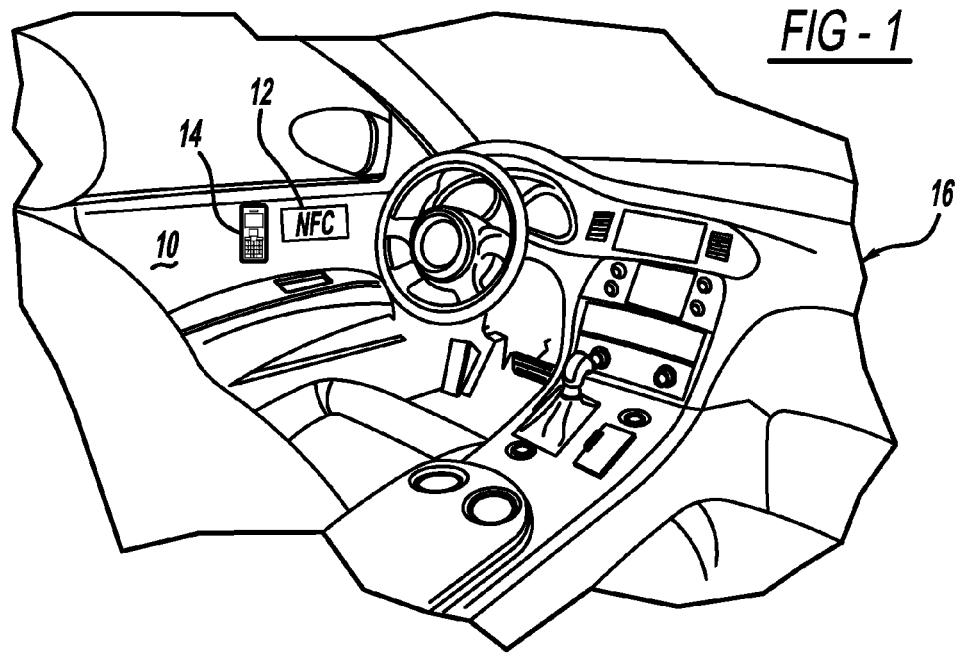
FIG. 1 is a partial interior view of a vehicle showing a driver side door containing a Near Field Communication (NFC) tag.

The following discussion of the embodiments of the invention directed to simplified pairing of wireless electronic devices employing Near Field Communication tags is merely exemplary in nature, and is in no way intended to limit the invention or its applications or uses. For example, most of the embodiments are described in terms of Bluetooth device connectivity, but connectivity of Wi-Fi devices is an equally appropriate example in some cases.

There are many scenarios in which it is desirable for two or more electronic devices to wirelessly communicate with each other. One common scenario is where a person has a mobile phone or other electronic device which she wants to use in her vehicle. In the case of the mobile phone, it is advantageous for the user to integrate the mobile phone with the embedded systems in the vehicle, such as the speakers and microphone, which are included as part of the vehicle's information and entertainment systems. This integration allows the mobile phone to be operated in a hands-free mode while in the vehicle. Many vehicle manufacturers now include Bluetooth capabilities in their vehicles, specifically for this purpose.

Bluetooth is an open, secure protocol for wirelessly exchanging data over short distances from fixed and mobile devices. Bluetooth uses radio frequency (RF) technology at 2.4 gigahertz or GHz ($2.4 \times 10^9$ cycle/sec), to wirelessly communicate between two or more devices, at a gross data rate of up to 1 mega-bit per second (Mb/s). Bluetooth provides a way to connect and exchange information between devices, such as mobile phones, computers, vehicle communication and entertainment systems, printers, Global Positioning System (GPS) receivers, digital cameras, and video game consoles. When a device is said to be Bluetooth enabled, it means that device includes a small computer chip that contains the Bluetooth radio and software that enables that device to connect to other devices wirelessly using Bluetooth technology.

While the Bluetooth standard supports secure and reliable wireless communication between electronic devices, and while Bluetooth is widely supported by both vehicle manufacturers and consumer electronics device manufacturers, many consumers feel that the process of establishing Bluetooth communications between two devices, often known as pairing, is cumbersome and unintuitive. The embodiments of the present invention solve this problem by using Near Field Communication (NFC) technology to simplify the multi-step data-intensive Bluetooth pairing process.

Near Field Communication (NFC) is a short-range wireless connectivity technology that evolved from a combination of existing contactless identification and interconnection technologies. Products with built-in NFC can simplify the way consumer devices interact with one another, helping speed connections, receive and share information, and make fast and secure payments. Operating at 13.56 megahertz, or MHz ($13.56 \times 10^6$ cycles/sec), and transferring data at up to 424 Kilo-bits per second, NFC provides intuitive, simple, and reliable communication between electronic devices. NFC is both a "read" and "write" technology. Communication between two NFC-compatible devices occurs when they are brought within about two to four centimeters of one another. A simple wave or touch can establish an NFC connection, which is then compatible with other known wireless technologies, such as Bluetooth or Wi-Fi. The underlying layers of NFC technology follow universally implemented standards of the International Organization for Standardization (ISO) and other standards organizations. Because the transmission range is so short, NFC-enabled transactions are inherently secure. Also, physical proximity of the device to the reader gives users the reassurance of being in control of the process. NFC can be used with a variety of devices, from mobile phones that enable payment or transfer information to digital cameras that send photos to a television with just a touch. NFC read-only tags are very inexpensive, and are small enough to be placed almost anywhere. The NFC tag is a passive device with no power of its own. When an NFC tag is used, a user passes an NFC enabled reader/writer device near the NFC tag. A small amount of power is taken by the NFC tag from the reader/writer device to power the tag electronics. The tag is then enabled to transfer a small amount of information to the reader/writer device. Many Bluetooth enabled devices now include Near Field Communication (NFC) reader/writer capabilities.

One general approach to implementing the present invention employs low cost NFC read-only tags in a vehicle to enable simple and secure device pairing. FIG. 1 is a partial inside view of a vehicle 16 showing a driver side door 10 with an NFC tag 12 affixed to the door 10. The tag 12 can be attached by a stick-on decal, designed into a component which snaps into the door trim panel, or any other design technique which results in the tag 12 being located on the surface of the inner door trim panel. The NFC tag 12 in this embodiment is a read-only tag which can be encoded with the encryption key of the host vehicle's Bluetooth system or other information that could include Bluetooth device address, pass code, system identity or other information. The tag 12 does not require any power supply or data connection to the vehicle 16. It is entirely stand-alone, and it acts as a transponder by echoing back the encoded encryption key when queried by an NFC reading device. The door 10 is used here as an example, but the NFC tag 12 could be placed in any other location which is convenient to a driver of the vehicle 16, such as a steering wheel or a dash panel.

In order for a driver to pair an electronic device 14, such as a mobile phone, to the vehicle, the driver must pass the device 14 within about two centimeters of the NFC tag 12. This allows the device 14, if it has NFC reader/writer capability, to read the vehicle's Bluetooth encryption key from the tag 12. Three embodiments of this approach are proposed, where all of them require the NFC tag 12 for passing the vehicle's encryption key to the other wireless device 14. The three embodiments disclose different methods of triggering the pairing process; two are implemented in hardware, and one is implemented in an algorithm.

A common factor in all of the vehicle-device pairing systems and methods described herein is that the vehicle's Bluetooth-enabled device, by default, is in a silent mode. This means that the vehicle's Bluetooth device will not accept any pairing request, regardless of whether another Bluetooth device is transmitting a proper encryption key. The silent mode, also known as non-discovery mode, is used by design to prevent unwanted or unauthorized pairing attempts, or even malicious hacking attempts. Some trigger is needed to cause the vehicle's embedded Bluetooth system to temporarily switch to a discovery mode, where Bluetooth pairing requests may be accepted.

Figure 2:
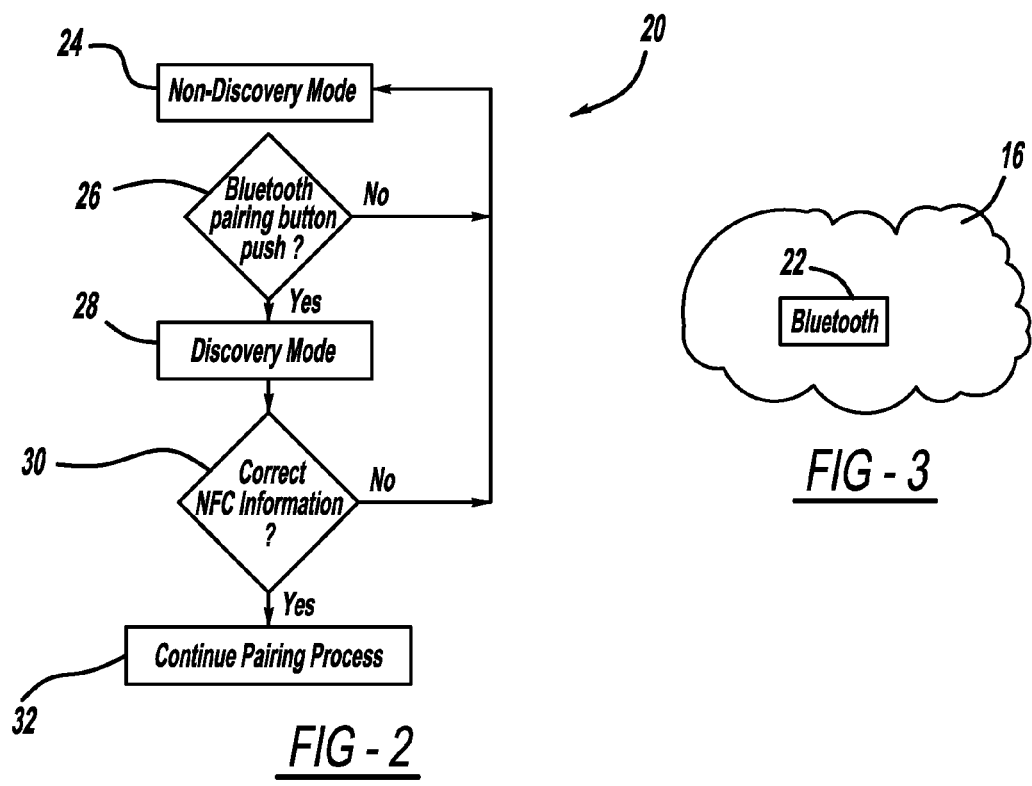
FIG. 2 is a flow chart diagram showing a process for pairing Bluetooth devices that uses an NFC tag and a button.
Figure 3:
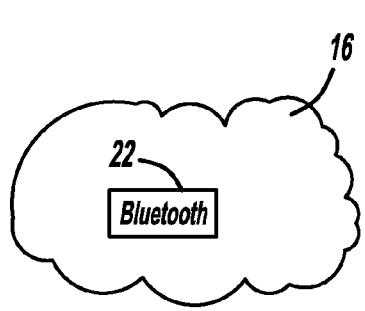
FIG. 3 is an illustration of a Bluetooth button on a vehicle used in the process of FIG. 2.

FIG. 2 is a flow chart diagram 20 showing a process for pairing Bluetooth devices. In this embodiment, the triggering mechanism is a button in the vehicle 16 which the driver or user would push. FIG. 3 shows a cut-away view of the vehicle 16 including a button 22 for triggering the pairing process, as discussed. The process begins with the vehicle's Bluetooth device in a silent or non-discovery mode at box 24. The process waits at decision diamond 26 for the button 22 to be pushed. Until the button 22 is pushed, the process remains in the non-discovery mode at the box 24. If the driver pushes the button 22 to initiate the Bluetooth pairing process, the process switches to a discovery mode at box 28. Within a short period of time, to be defined in the specific vehicle application, the driver or user of the mobile phone or other electronic device 14 must pass the device 14 near the NFC tag 12. This allows the device 14 to read the vehicle's Bluetooth encryption data, including a passkey and a Bluetooth device address, and begin transmitting the encryption data in an attempt to pair with the vehicle's embedded device. With the vehicle's Bluetooth system in the discovery mode as a result of the push of the button 22, the system will receive the transmission from the device 14. The algorithm will recognize its own encryption data at decision diamond 30, which the device 14 received from the NFC tag 12. The process will then proceed to box 32 where it will continue the information exchange and authentication with the device 14, per the standard Bluetooth pairing process. The pairing process will be completed with no further action required by the user of the device 14.

FIG. 4 is a flow chart diagram 40 showing a process for pairing Bluetooth devices that uses the NFC tag 12 and a tuned object detection device, such as tuned circuit 42 shown in FIG. 5, operating as the triggering mechanism to put the vehicle's Bluetooth system in the discovery mode. For the purposes of this embodiment, the tuned circuit 42 is a simple electronic circuit which senses the presence of an object nearby, without requiring a button to be pushed or any other physical contact. The tuned circuit 42 could be an inductive sensor, a capacitive sensor, or any other type of non-contact object detection circuit. The tuned circuit 42 could be placed anywhere in the passenger compartment of the vehicle 16, but would most logically be placed near the NFC tag 12. In that way, the user could pass the device 14 near both the tag 12 and the tuned circuit 42 in one motion, thereby allowing the device 14 to read the vehicle Bluetooth device's encryption data from the tag 12 and also causing the tuned circuit 42 to trigger the vehicle Bluetooth device into discovery mode.

The process begins with the vehicle's Bluetooth device in the non-discovery mode at box 44. The process waits at decision diamond 46 for the tuned circuit 42 to detect the presence of a nearby object. Until the circuit 42 detects an object, the process remains in the non-discovery mode at box 44. When the driver passes the electronic device 14 near the tuned circuit 42 the Bluetooth pairing process is triggered at decision diamond 46, and the process switches to the discovery mode at box 48. At or near the same time, the driver or user of the device 14 passes the device 14 near the NFC tag 12. This allows the device 14 to read the vehicle's Bluetooth encryption data, and begin transmitting the data in an attempt to pair with the vehicle's embedded device. With the vehicle's Bluetooth system in the discovery mode as a result of the trigger from the tuned circuit 42, the vehicle's Bluetooth system will receive the transmission from the device 14. The vehicle's Bluetooth system will recognize its own encryption data at decision diamond 50, which the device 14 received from the NFC tag 12. The process will then proceed to box 52 where it will continue the information exchange and authentication with the device 14, per the standard Bluetooth pairing process. The pairing process will be completed with no further action required by the user of the device 14.

FIG. 6 is a flow chart diagram 60 showing a process for pairing Bluetooth devices that uses the NFC tag 12 and a software algorithm. In this embodiment, the triggering mechanism to put the vehicle's Bluetooth system in discovery mode is not a hardware device, but rather is a software algorithm which is running on the vehicle's Bluetooth system. The process begins with the vehicle's Bluetooth device in the non-discovery mode at box 62. The process enters a limited discovery mode whenever the vehicle's ignition is on. If the ignition is on at decision diamond 64, then the algorithm enters a limited discovery mode at box 66. In the limited discovery mode, the system listens for an Out-Of-Band (OOB) pairing request from another device, such as the device 14. An Out-Of-Band pairing request is enabled by communication from a device which is outside the Bluetooth frequency bandwidth of 2.4 GHz. In this case, the Out-Of-Band pairing information is obtained by transmitting on the NFC frequency of 13.56 MHz by the device 14.

The device 14 transmits the Out-Of-Band pairing request when it senses that it has received information from an NFC read-only tag, which happens when the user passes the device 14 near the NFC tag 12. If the algorithm detects an Out-Of-Band pairing request at decision diamond 68, then the algorithm enters the discovery mode at box 70. If the device 14 has been passed near the NFC tag 12, the device 14 will have read the vehicle Bluetooth system's encryption data, and will be transmitting the data in a pairing attempt. With the vehicle's Bluetooth system in the discovery mode as a result of the Out-Of-Band request trigger, the vehicle's Bluetooth system will receive the transmission from the device 14. The encryption data will be checked at decision diamond 72, and will be verified as correct when the system receives the correct encryption data from the device 14, which the device 14 read from the NFC tag 12. The automatic pairing process will then continue at box 74, and will be completed with no further action required by the user of the device 14.

Simplification of the Bluetooth pairing process can be carried beyond the vehicle-to-device embodiments described above. The same need for simplification exists in the pairing of any two Bluetooth devices, such as one gaming system to another, or a personal music player to a stereo amplifier/speaker system. If an NFC tag is embedded in one such device, and the tag is encoded with the Bluetooth encryption data for that device, then the same general approach for proximity-based pairing employing NFC tags can be used. In this case it is most advantageous to use a software-only approach to triggering the devices into the discovery mode, so as not to require any extra buttons or other hardware to be added to the electronic devices.

Figure 7:
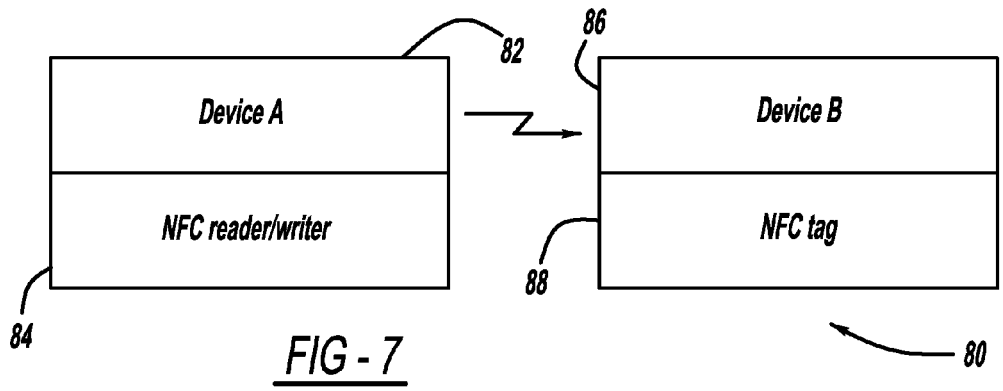
FIG. 7 is a block diagram of a system including two Bluetooth devices which can be securely paired by placing the devices near each other.

FIG. 7 is a block diagram of a system 80 which includes two consumer electronics devices 82 and 86, shown as devices A and B, which can be paired using NFC technology for sharing encryption data at very close distances. The device 82 includes an NFC reader/writer 84, and the device 86 includes an NFC read-only tag 88. The device 86 can be any Bluetooth-enabled electronic device which is designed to normally remain in Bluetooth silent mode for security reasons, and which includes the NFC tag 88 for initiating the pairing process when another device is brought within very close physical proximity—that is, within the NFC range of about two centimeters.

Figure 8:
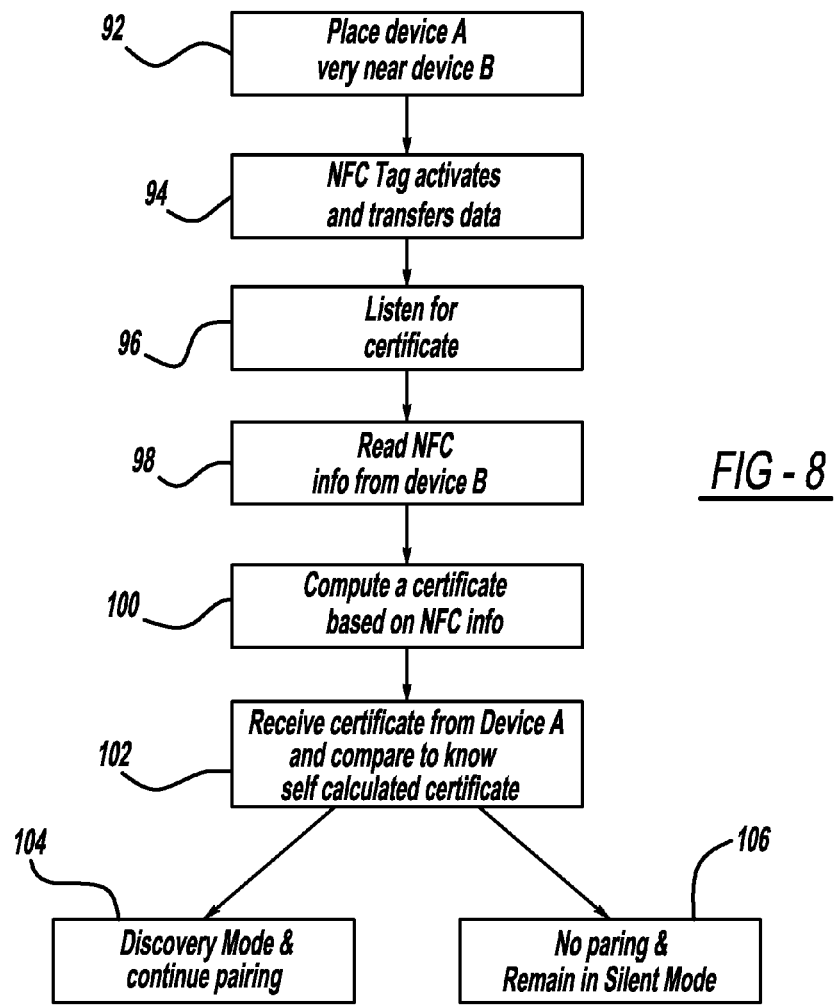
FIG. 8 is a flow chart diagram showing a process for pairing the Bluetooth devices shown in FIG. 7.

FIG. 8 is a flow chart diagram 90 showing a process for pairing the devices 82 and 86. The pairing process begins at box 92 when the device 82 is placed very near the device 86. At box 94, the NFC tag 88 in the device 86 is activated by the presence of the device 82. The NFC tag 88 transfers the data that it contains, which can include a Public Key, Bluetooth address and an ID number or other information required for device pairing for the device 86. Subsequently, the device 86 listens for a Bluetooth certificate at box 96. At box 98, the device 82 reads the information from the NFC tag 88. The device 82 then computes a Bluetooth certificate at box 100, based on the Public Key, the Bluetooth address and the ID number. The device 82 transmits the certificate over the Bluetooth frequency. The device 86 receives the certificate from the device 82 at box 102. The device 86 compares the certificate it received from the device 82 to a known self-calculated certificate. If the two certificates match at decision diamond 104, then the device 86 switches to the discovery mode at box 106, and the pairing process continues per the Bluetooth standard. If the two certificates do not match, then the device 86 will remain in the silent mode, and no pairing will be established at box 108.

In the manner described above, the pairing of two Bluetooth-enabled electronic devices is as simple as bringing the two devices very close to each other—often described as bumping, tapping, or waving the devices. The NFC read-only tag 88 and the software added to the device 86 makes this possible, even when the device 86 is designed to normally remain silent for security reasons.

Simplification of the pairing process between electronic devices can also be extended to include more than two devices. NFC tags can be used to facilitate connecting multiple electronic devices together in what is known as a piconet, or very small network. A piconet can be established in any geographic space, such as a vehicle, an office or conference room, or a coffee shop. In order to use NFC pairing to establish a piconet, multiple NFC tags are needed, one for each device which may join the piconet.

Figure 9:
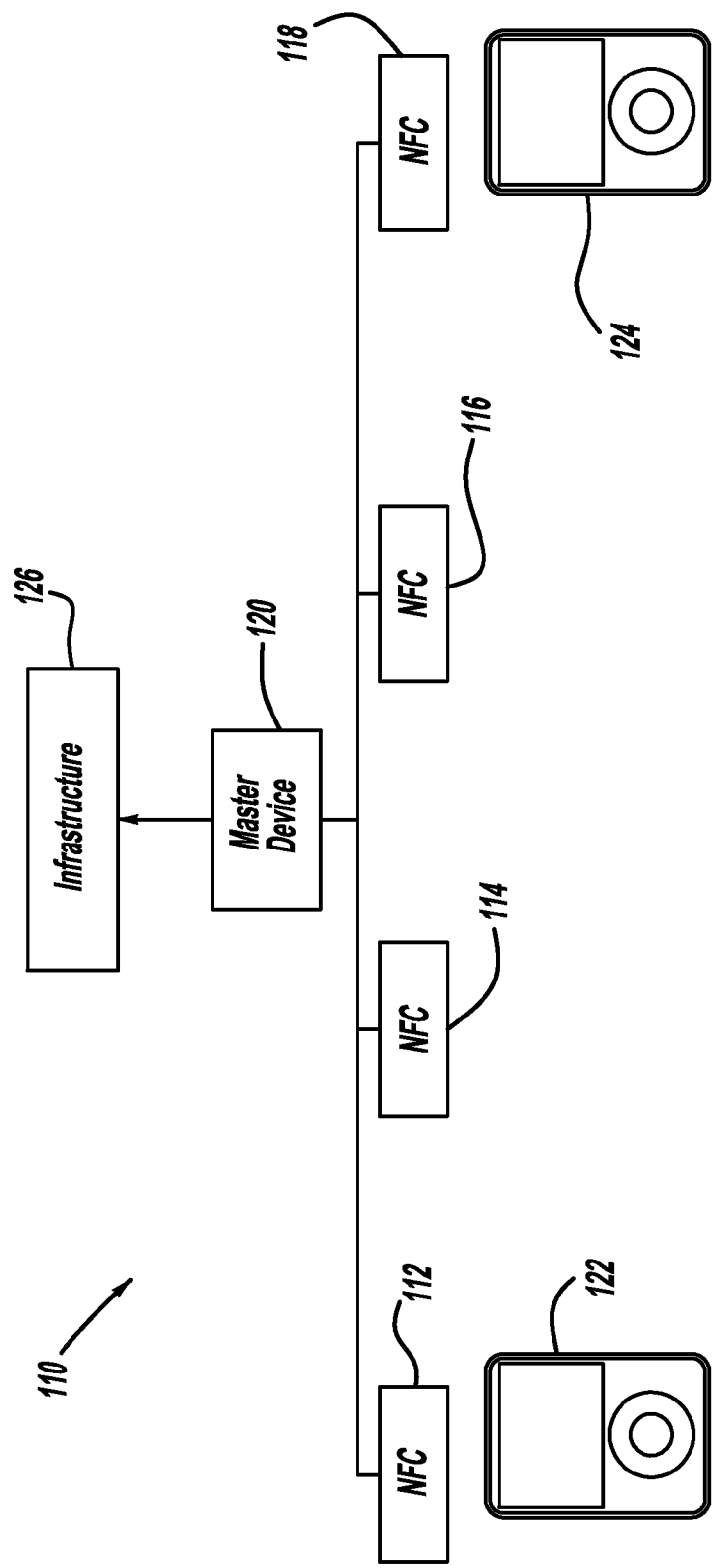
FIG. 9 is a block diagram of a system in a vehicle which uses NFC tags for secure pairing of multiple Bluetooth devices.

FIG. 9 is a block diagram of a system 110 showing one embodiment for multiple device connectivity in a vehicle environment. In this embodiment, NFC tags can be placed at various locations around the vehicle interior. For example, NFC tag 112 can be placed at a location convenient to the driver, such as on the door as described previously. NFC tag 114 could be located on the front passenger door, and other NFC tags 116 and 118 could be located on the back seats at passenger locations. Each person wishing to include an electronic device in the piconet could simply wave his or her device past the NFC tag at his or her seat location, and the device would be paired automatically, as described previously.

The system 110 includes an embedded Bluetooth master device 120 that maintains control over the piconet, including profiles for each device. Profiles could be used to designate which features or capabilities each device is allowed to use. For example, a device 122 which is known to belong to the vehicle driver could have access to hands-free calling, navigation system control, audio playback capability, and other features. In contrast, a device 124 belonging to a rear seat passenger may only be given audio playback capability or additional capabilities such as video playback that the driver would not have when the vehicle is in motion. Other capabilities of a piconet, such as multi-participant gaming systems, may specifically exclude the driver's device 122 if the vehicle is running. And still other capabilities, such as sharing music files between devices, may be offered to all devices on the piconet. The master device 120 would control which other devices on the piconet have access to shared infrastructure 126, such as vehicle speakers, microphones, and video displays. Many scenarios are possible once the network of devices is established. And the NFC tag technology enables the network setup to be fast, flexible, simple, and secure. The only requirement of each participating device is that it has NFC reader/writer capability, as many Bluetooth devices now do or will soon have.

FIG. 10 is a flow chart diagram 130 showing a process for the quick control of a vehicle entertainment system's playback features using NFC tags for secure pairing of Bluetooth devices that could be implemented in a multi-device network. The process begins at decision diamond 132 that determines if an Out-Of-Band pairing request has been made. When an Out-Of-Band pairing request is detected, the process checks to determine whether there is an existing Bluetooth network established at decision diamond 134. If there is no ongoing session, then the process proceeds with the pairing process and grants access to the entertainment system playback device at box 136. If an ongoing session is detected at decision diamond 134, then the process determines which profile, or type of session, is selected at box 138. If the existing session is defined as open or unrestricted control, then the existing session is ended at box 140, the pairing process is completed, and access is granted to the playback device at box 142. If it is determined that the existing session is restricted, then permission is required from the device currently in control of the session. At decision diamond 144, the device in control of the existing session is asked whether it will release control. If so, then access is granted to the playback device at box 146. If the device in control of the existing session does not release control, then the Out-Of-Band pairing request is ignored at box 148. The process as described would allow convenient access to the entertainment system controls in a vehicle for any Bluetooth device which has NFC reader/writer capability, even when the vehicle Bluetooth system is designed to normally remain in silent mode.

Another embodiment of a multi-device piconet could be in an office environment, or even in a semi-public place like a coffee shop. In this type of implementation, the NFC tags could be placed in furniture items like tables and chairs, or in something like the coffee cups at a coffee shop. Again the NFC tags can be used to trigger Bluetooth devices which are normally in silent mode for security reasons to begin a simple and secure pairing process. An embodiment in a conference room of an office building could be implemented as follows. Each chair, or each place at a table, could have an NFC read-only tag affixed to it. Each person wishing to join an electronic device to the conference room piconet would just have to pass his or her device near the NFC tag. The conference room could be equipped with a dedicated device to serve as the master of the pairing domain, as described previously.

In an even more flexible embodiment, in a business establishment environment such as a coffee shop, NFC tags could be provided, for example, in coffee cups which have been paid for. This would allow the establishment to control which people take advantage of the network services in their facility, limiting those services to paying customers. The establishment would maintain a secure wireless network, but make it very easy for their customers to join their electronic devices to the network. It would also be possible for groups of acquainted people to set up their own private piconet in an establishment like a coffee shop, by passing each person's device near the same NFC tag. This private piconet embodiment would not require a separate master device, that is, any one of the participating users' electronic devices could serve as the domain master, and such an embodiment would not have access to any shared infrastructure. It would simply be a peer-to-peer network for gaming, data sharing, or other such applications.

In all of the embodiments and environments described above, the NFC tag is used to facilitate the pairing of electronic devices, even devices which normally remain silent for security reasons, without requiring a user to key in security codes or follow any other procedures.

The concept of piconets, or small networks of electronic devices, applies to communication protocols other than Bluetooth as well. For example, piconets are commonly established between ad hoc groups of personal computers (PC's) using wireless Local Area Networks, or Wi-Fi.

Wi-Fi is a name commonly used to represent wireless Local Area Network (LAN) communication based on the Institute of Electrical and Electronics Engineers' (IEEE) 802.11 standards. Originally an acronym for "wireless fidelity", the term Wi-Fi is now commonly used by the public as a synonym for IEEE 802.11 wireless LAN communication. Like Bluetooth, Wi-Fi is a Radio Frequency (RF) communication technology. In a typical Wi-Fi environment, one or more electronic devices communicate with a wireless router or access point, where the router or access point is physically connected by wire to a Wide Area Network (WAN) and/or the Internet. Computers or other electronic devices wishing to wirelessly communicate with the access point must be within range of the RF signal, and if security has been implemented on the router or access point, connecting devices must also know and share an encryption key in order to be admitted. Wi-Fi is supported by many applications and devices including video game consoles, home networks, personal digital assistants, mobile phones, computer operating systems, and other types of consumer electronics.

NFC technology is equally applicable to the establishment of Wi-Fi networks as it is to Bluetooth networks. Using NFC tags for establishment of secure Wi-Fi networks is particularly applicable in the office environment or the business establishment environment described previously, for fast and secure networking of laptop computers. A secure Wi-Fi network requires each participating wireless device such as a laptop computer to know and transmit an encryption key in order to be allowed to join the network. This is very similar to the encryption key information described previously for Bluetooth pairing. NFC read-only tags can be used to communicate the network encryption key to any computer with NFC reader/writer capability which is brought within close proximity, and that computer can then use the encryption key to gain access to the wireless network.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for establishing a secure wireless communications network between electronic devices, said method comprising:
   providing a plurality of electronic devices which use a common protocol for wireless communications with other devices, each device containing a Near Field Communication reader/writer;
   providing a master electronic device which is capable of controlling other devices in the network;
   providing a plurality of Near Field Communication read-only tags within a defined geographic space, where the defined geographic space is a vehicle which includes an entertainment system, and each tag of the plurality of Near Field Communication read-only tags is placed at a different seating location within the vehicle, and where each tag contains secret information about the master electronic device;
   passing each electronic device which is intended to be added to the network near one of the Near Field Communication read-only tags;
   computing and wirelessly transmitting an authentication certificate from each device which is calculated from the secret information which was read from a Near Field Communication tag;
   using the transmitted authentication certificate, if valid, to trigger the master electronic device to temporarily switch from a non-discoverable mode to a discoverable mode; and
   completing the establishment of communications by exchanging additional data as required by the wireless communications protocol being used.

2. The method of claim 1 further comprising defining a profile of attributes for each device, said profile being defined based on which Near Field Communication tag was used by the device to join the network.

3. The method of claim 2 further comprising using the master device to control privileges for each device in the network based on each device's profile.

4. The method of claim 3 wherein the privileges for each device include playback of audio and video on the vehicle's entertainment system.

5. The method of claim 4 further comprising;
   allowing a user of each device to request access to the vehicle's entertainment system; and
   allowing a user of the master device to grant or deny each request for access to the vehicle's entertainment system.

6. The method of claim 1 wherein the protocol for wireless communications is Bluetooth.

7. The method of claim 1 wherein the protocol for wireless communications is Wi-Fi wireless local area network.

8. A method for establishing a secure wireless communications network between electronic devices, said method comprising:
   providing a plurality of electronic devices which use a common protocol for wireless communications with other devices, each device containing a Near Field Communication reader/writer;
   providing a master electronic device which is capable of controlling other devices in the network;
   providing a plurality of Near Field Communication read-only tags within a defined geographic space, where the defined geographic space is a room within a building, and each tag of the plurality of Near Field Communication read-only tags is placed on a portable object which may be moved anywhere within the room, and where each tag contains secret information about the master electronic device;
   passing each electronic device which is intended to be added to the network near one of the Near Field Communication read-only tags;
   computing and wirelessly transmitting an authentication certificate from each device which is calculated from the secret information which was read from a Near Field Communication tag;
   using the transmitted authentication certificate, if valid, to trigger the master electronic device to temporarily switch from a non-discoverable mode to a discoverable mode; and
   completing the establishment of communications by exchanging additional data as required by the wireless communications protocol being used.

9. The method of claim 8 wherein each tag in the plurality of Near Field Communication read-only tags also contains other information besides the secret information about the master electronic device.

10. A system for establishing a secure wireless communications network between electronic devices, said system comprising:
    a plurality of electronic devices which use a common protocol for wireless communications with other devices, each device containing a Near Field Communication reader/writer;
    a master electronic device which is capable of controlling other devices in a network;
    a plurality of Near Field Communication read-only tags within a defined geographic space, where the defined geographic space is a vehicle, and each tag of the plurality of Near Field Communication read-only tags is placed at a different seating location within the vehicle, and where each tag contains secret information about the master electronic device, wherein each device in the plurality of electronic devices includes a software algorithm for computing and wirelessly transmitting an authentication certificate that is calculated from the secret information which was read from a Near Field Communication tag; and
    a triggering mechanism that causes the master electronic device to temporarily switch from a non-discoverable mode to a discoverable mode, wherein the master electronic device includes a software algorithm for detecting a transmitted authentication certificate and, upon detection of a valid certificate, cause the master electronic device to temporarily switch from the non-discoverable mode to the discoverable mode.

11. The system of claim 10 wherein the triggering mechanism for causing the master electronic device to temporarily switch from the non-discoverable mode to the discoverable mode is the software algorithm on the master electronic device.

12. The system of claim 11 wherein the wireless communications protocol is Bluetooth.

13. The system of claim 12 further comprising a controller for managing privileges of each device in the network and allowing selective access to systems within the vehicle.

14. The system of claim 13 wherein the systems within the vehicle include audio and video systems, and the privileges of each device include playback functions on the audio and video systems.

15. The system of claim 11 wherein the wireless communications protocol is Wi-Fi wireless local area network.

* * * * *